June 8, 1965 V. D. COOMBS 3,187,566
FATIGUE TESTING MACHINE

Filed March 30, 1962 2 Sheets-Sheet 1

INVENTOR.
VERNER D. COOMBS
BY Robert H Montgomery
ATTORNEY

June 8, 1965  V. D. COOMBS  3,187,566
FATIGUE TESTING MACHINE
Filed March 30, 1962  2 Sheets-Sheet 2
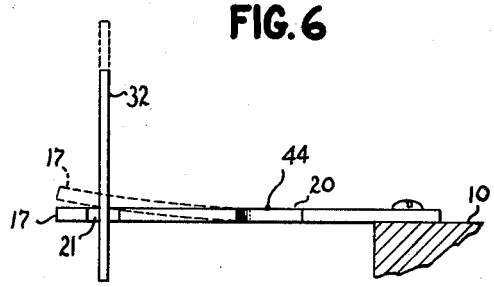
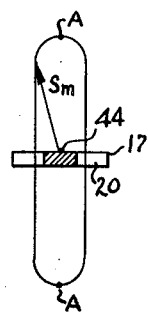
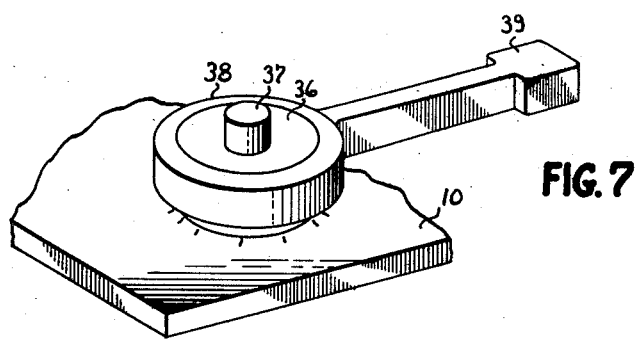
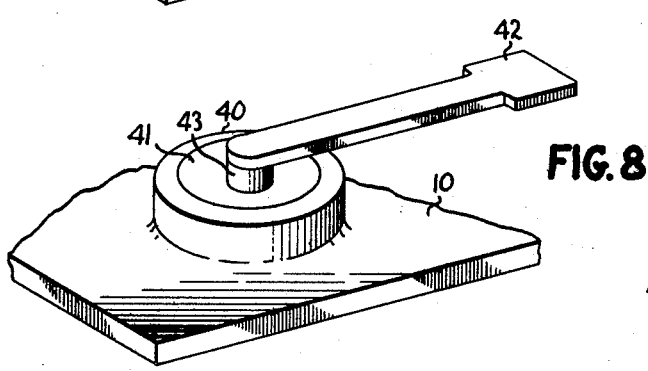
INVENTOR.
VERNER D. COOMBS
BY Robert H. Montgomery
ATTORNEY

United States Patent Office 3,187,566
Patented June 8, 1965

3,187,566
FATIGUE TESTING MACHINE
Verner D. Coombs, Erie, Pa., assignor to General Electric
Company, a corporation of New York
Filed Mar. 30, 1962, Ser. No. 183,787
17 Claims. (Cl. 73—100)

The present invention relates to a fatigue testing machine, and more particularly to a fatigue testing machine for testing specimens under cyclic loads.

A complete analysis or description of the fatigue behavior of metals or materials normally requires extensive fatigue data since there are various influences that can be placed on an individual metal or material. Conventional fatigue testing machines that can develop comprehensive test data on specimens present recognized limitations including time of testing and limitations on the number of specimens that can concurrently be tested. The total expenditures for a fatigue test using conventional machines consist primarily of specimen preparation costs, costs for mounting the specimen and adjusting the particular test machine, and the necessary costs for personnel to monitor the test itself. From the viewpoint of available time, a maximum number of test specimens with a minimum number of adjustments, calibrations, or failure detections on individual specimens is desirable.

Most conventional fatigue testing machines may be placed in one of two main categories: First, those machines that impose an alternating displacement upon a specimen or specimens, and second, those machines that impose an alternating load upon the specimen or specimens.

In order to predetermine an alternating stress in a specimen in the alternating displacement test, it is usually necessary to express the displacement in terms of some load that could cause such a displacement, and to calculate the stress from that value of load. When the relationship between the displacement and the equivalent load has been calculated or measured for a single specimen, it is usually expedient to make any additional specimens precise copies of the first, by accurate machining, in order that the load-displacement relationship need not be determined for each specimen. However in an alternating load test, it is only necessary to calculate the stress level for a given load and then set the testing machine for that particular load. The accuracy of this calculated stress level is influenced by the geometry of the specimen only in the failure region, and thus accurate machining of the specimen is important only in the expected failure region, for the alternating load test. It is also possible in an alternating displacement test for a crack to initiate in the specimen but not to develop immediately to complete failure; while in an alternating load test, initiation of a crack in a test specimen is generally followed immediately by a failure of the specimen.

Some examples of conventional fatigue testing machines of the alternating displacement type would include those where a stationary specimen is deflected by a cam or crank arm action, or a rotating specimen is suitably deflected, or a stationary specimen is excited at its natural frequency. Some examples of alternating load testing machines may include those where a stationary specimen is loaded by a spring that is deflected by a cam or an eccentric action, or where a stationary specimen is loaded by a screw mechanism or by a hydraulic mechanism that is load sensed and controlled. Other examples of alternating load testing machines are where a rotating specimen is loaded by weights or by springs, or a stationary specimen is loaded by a rotating unbalance, and where a vibrating cantilever beam type specimen has a mass attached.

The aforementioned types of known fatigue testing machines include most of those that have found specific use in the past. Each machine usually has certain advantages and disadvantages peculiar to its individual design. Generally, the particular type of machine achieves a desired effect only by sacrificing a desirable flexibility of application.

In view of the known limitations of prior art fatigue testing machines, this invention contributes a fatigue testing machine having flexibility to provide a capability for testing a wide variety of shapes and sizes of test specimens as well as more flexible modes of loading these specimens.

Accordingly, it is a primary object of the invention to provide a new and improved fatigue testing machine of the constant load amplitude type.

Another object of the invention is to provide a new and improved fatigue testing machine that facilitates mounting and testing of one or more varieties of specimens at high cyclic rates without interaction between the specimens.

A further object of the invention is to provide a new and improved fatigue testing machine that can accommodate specimens which require little accurate machining and no previous calibration.

Still a further object of the invention is to provide a new and improved fatigue testing machine that is adapted to mount multiple specimens and operate under elevated temperature and mean-load conditions.

Yet another object of the invention is to provide a new and improved fatigue testing machine that will facilitate imposing a variety of stress levels in various sequences on a specimen.

An additional object of the invention is to provide a new and improved fatigue testing machine that requires no special failure sensing device for a specimen.

A further object of the invention is to provide a new and improved fatigue testing machine that does not require load sensing and control of amplitude of displacement.

Briefly stated, the invention in one form thereof comprises a shake table having a test specimen positioned thereon to develop complex motions in synchronism with the table. A mass is coupled to the test specimen by a support means that imparts cyclic rotation from the table to the mass and thus develops complex fatigue testing stresses on the test specimen.

The novel features of the invention are pointed out with particularity in the claims appended to and forming part of this specification. However, the organization and operation, together with further objects and advantages of the invention may best be understood by reference to the following description taken in conjunction with the accompanying drawings, in which:

FIG. 5 is a stress vector pattern exerted on the test specimen shown by FIG. 4, and taken along section 5—5 of FIG. 4;

FIG. 6 is a side view of the test specimen of FIG. 4 under cyclic load conditions with the dash line position indicating a maximum deflection of the test specimen during operation of the fatigue tester of the invention; and FIGS. 7 and 8 illustrate partial perspective views of other forms of fatigue testers embodying the invention.

Figure 1:
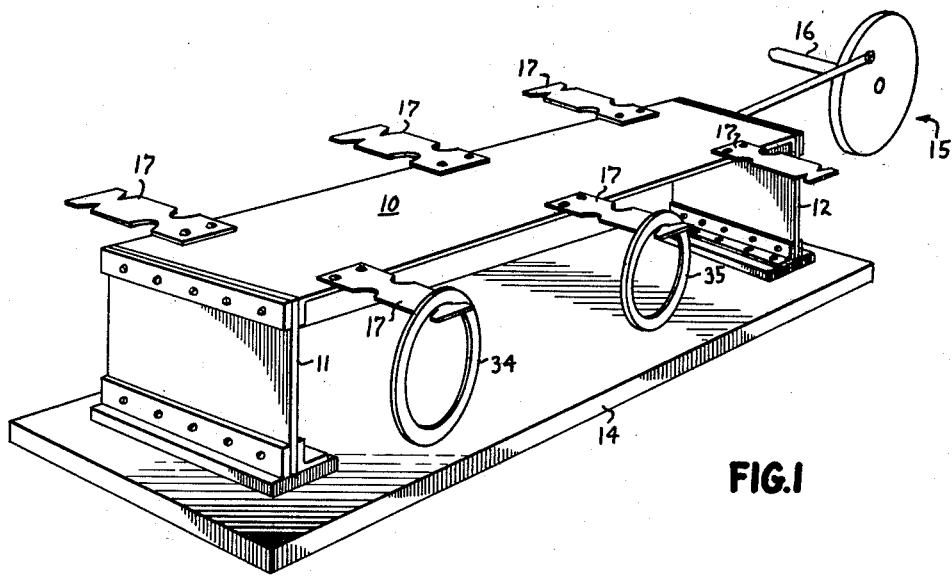
FIG. 1 is a perspective view of a fatigue testing machine formed in accordance with the invention and having one form of test specimen arrangement secured thereto.

Referring to the drawings and in particular to FIG. 1, the fatigue testing machine of the invention comprises one form of a conventional shake table having a top member 10 that is supported at opposite ends by flexible end pieces 11 and 12. End pieces 11 and 12 are secured to a support means such as the platform 14 to space the top member 10 from the platform 14 and to permit cyclic motion of the top member 10. Cyclic motion is imparted to the top member 10 by any known arrangement, for example, the conventional rotating wheel and crank arm linkage arrangement 15 as shown by FIG. 1. The wheel may be rotated at variable speeds as hereinafter explained. It is contemplated that the shaft 16 is driven by a controllable speed motor, not shown.

The desired fatigue test data is obtained from the fatigue testing machine of the invention by a plurality of test specimens 17 that are removably secured to the top member 10 by any known means, for example, bolts or the like. One or more test specimens 17 may be secured to the top member 10 for testing at one time. In one possible arrangement of the test specimens, the specimens 17 extend horizontally in a cantilever beam-type arrangement and are necessarily positioned so that the direction of motion of the top member 10 is across the expected axes of rotation of rings 34 and 35, hereinafter described. These would ordinarily be the beam axes of specimens 17. When this condition is satisfied, in the fatigue tester of the invention, the alignment of the test specimens 17 with regard to the top member is not critical.

Figure 2:
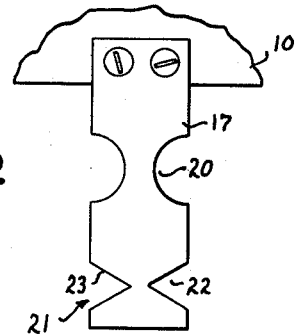
FIG. 2 is an enlarged plan view of a test specimen secured to a fatigue tester such as shown by FIG. 1.

A single test specimen 17 is more clearly shown by FIG. 2. The test specimen 17 is removably secured to the top member 10 of a shake table to extend in a cantilever fashion as described. The test specimen 17 should have a necked portion 20 to act as a region of stress level higher than in other regions of the test specimen 17, in order to locate the expected region of failure so that the failure stress level may be estimated and preset for the test. The test specimen 17 also has a reduced portion such as a race or groove 21 formed by opposed notches 22 and 23. The race or groove 21 is generally adjacent the free end of the cantilevered test specimen 17.

Figure 3:
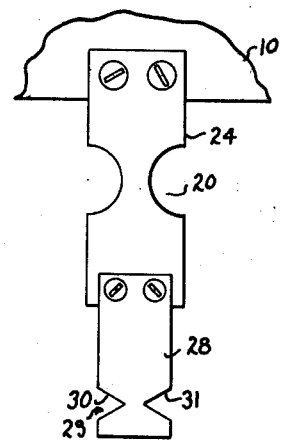
FIG. 3 is an alternate form of test specimen arrangement in accordance with the invention.

Another form of test specimen that may be removably secured to the fatigue tester of the invention is shown by FIG. 3. A readily produced test specimen 24 is removably secured to the top member 10 of the shake table, previously described and illustrated by FIG. 1, in a cantilever fashion. The test specimen 24 has a necked portion 20 to control the region of fatigue during a test. In lieu of a separate race or groove being formed in the test specimen 24, an appendage 28 is removably secured to the free end of the cantilevered test specimen 24 to extend along the beam axis. The appendage 28 provides a reusable element for various test specimens and accordingly can be machined to more critical tolerances. The appendage 28 has a reduced portion such as a race or groove 29 that may be formed by opposing notches 30 and 31, or may be machined from blank stock to provide something other than a rectangular cross-section at the reduced portion.

Figure 4:
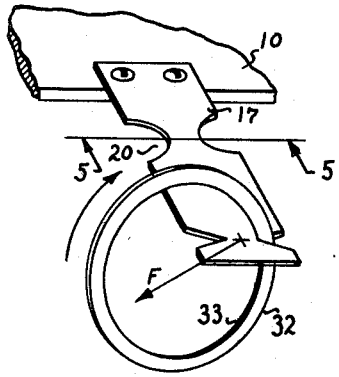
FIG. 4 is a perspective view of a test specimen of FIG. 2 with a cyclic load positioned thereon.

The particular test specimens, either specimen 17 as illustrated by FIGS. 1 and 2, or test specimen 24 as illustrated by FIG. 3, are cyclicly loaded, as illustrated by FIG. 4. The test specimen 17 is loaded at the race or groove 21 by a revolving mass such as ring 32. The test specimen 17 is removably secured to the top member 10, partially shown, as previously described and illustrated by FIG. 1. The test specimen 17 has a necked portion 20 to limit the region of fatigue during the test and is secured to the top member 10 so that the axis of rotation of ring 32, and the beam axis of the specimen are across at least one direction motion of the top member 10 of the shake table. The inner circumferential surface 33 of the ring 32 impinges upon the race or groove 21 as the ring 32 is caused to rotate in synchronism with the motion of the shake table transmitted from the top member 10 through the test specimen 17. The frequency of the shake table is easily varied to facilitate starting and accelerating the ring 32 to operating speed.

As is readily apparent in FIGURES 1, 4, and 6 the mass, such as the rings 32, 34, and 35, is coupled to the test specimen so that its center of mass is displaced from the beam axis of the test specimen and it is also free to revolve. Thus the motion of the test specimen excites the mass to revolve about an axis of the test specimen as well as about an axis of the mass. Accordingly the fatigue tester of the invention cyclicly loads each test specimen 17 by a centrifugal force vector F, as illustrated by FIG. 4. The magnitude of the force vector F when the revolving mass such as the ring 32 acts upon the test specimen 17 can be determined by the following formula:

The centrifugal force vector $F$ equals $mw^2r$ (I)

where $m$ = the mass of the metal ring
$w$ = the angular velocity of the ring
$r$ = radius of revolution of the ring center determined by the ring inner-radius minus the groove radius This equation assumes that the path in space of the ring center is circular; table displacement and specimen deflection distort that path; however, any error introduced by this assumption is minor and easily compensated for.

In a flat cantilever beam-type test specimen, such as test specimen 17, illustrated by FIGS. 1, 2 and 4, the action of the force vector F on the necked portion 20 is more particularly shown by FIGS. 5 and 6. The whirling ring 32 cyclicly loads the test specimen 17 from a maximum tensile stress to a maximum compressive stress during each cycle of revolution of the ring 32. The maximum limits of stress are shown by FIG. 5 where the stress vector $S_m$ exhibits maximum tensile and compressive stresses at points A, A during each revolution of the ring 32. FIG. 5 illustrates a sectional view through the necked portion 20 of the test specimen 17 as illustrated by FIGS. 2 and 4. The stress vector $S_m$ acts upon an imaginary point 44 as a result of the deflection of the test specimen 17 under the cyclic load of the ring 32, as best shown by FIG. 6. In FIG. 6, the maximum deflection is shown by the dashed line position of the ring 32 and the cantilever beam specimen 17 under the loading of the force vector F. The stresses on the flat surface of the necked portion 20 of the test specimen 17 are therefore varied cyclicly and not necessarily sinusoidly from a maximum tensile to a maximum compressive during each cycle of revolution of the ring 32.

The peak value of stress, whether tensile or compressive, $S_m$, for each test specimen is:

$$S_m = \frac{Fl}{\frac{I}{c}} \qquad (II)$$

where $F$ is the centrifugal force vector value
$l$ is the distance from the center of groove 22 to the center of neck 20 (where failure will ordinarily occur)
$I/c$ is the minimum value of section modulus of the test specimen in the necked portion Thus, $$S_m = \frac{Fl}{\frac{(I)}{(c)}} = \frac{mw^2rl}{\frac{(I)}{(c)}} \qquad (III)$$

The important aspect of the stress Equation III is that the peak value of stress $S_m$ imposed on a test specimen is dependent upon: (1) the frequency at which the table oscillates, (2) the physical characteristics of the ring, (3) the thickness and width at the neck of the specimen, and (4) the neck-to-groove distance. This means that the "stress amplitude" applied to each test specimen is very accurately maintained in substantially automatic fashion. The accuracy of test data for each specimen is not influenced to any significant degree by either the action of adjacent test specimens and rings, the amount of cyclic deflection the table assumes, or the precision with which the specimen is mounted.

Referring again to FIG. 1, it is illustrated therein that the diameters of the ring, such as ring 32 illustrated by FIG. 4, can vary to impose different cyclic load factors on particular test specimens. The mass of each ring can also be varied as desired. Ring 34 has a dimension greater than that of ring 35 so that the cyclic load conditions imposed upon the test specimens 17 as illustrated by FIG. 1 will differ since the resulting centrifugal force vectors will have different magnitudes. The centrifugal force may also be varied by varying the frequency of the shake table, and thus the frequency of rotation of the rings 32, 34, 35. Variable frequency of the shake table as illustrated in FIG. 1 may be obtained by varying the speed at which shaft 16 is driven.

Thus, the fatigue testing arrangement of the invention reduces the cost of fatigue testing, as a plurality of test specimens can be tested without conflicting actions on a conventional shake table. The specimens can be quickly secured in place on the shake table without requiring direct power loading of each test specimen. Ample test data can be obtained for a given type specimen and for a given cost by the fatigue tester of the invention. Further, the test arrangement of the fatigue testing machine of the invention offers versatility as to the various types of conditions that may be imposed upon each test specimen. The effect of gravity may be added to the parameters of the stress equation to produce mean stress influences. The factor of temperature may also be introduced by encompassing the fatigue testing machine as illustrated by FIG. 1 within an oven or the like. Additionally, failure in a test specimen of a ductile material is not ordinarily catastrophic and at the earlier stages of a crack propagation in the necked portion, the revolving ring will drop out of synchronism with the table and stop, thus providing a built-in indicator device for an operator of a fatigue testing arrangement embodying the invention.

The shake table may take other forms than that illustrated in FIG. 1. For example, a shake table has been constructed wherein the top member 10 is formed of a plurality of rigid bars sopported at either ends thereof by members adapted to flex when cyclic movement is imparted to the shake table. Also, the specimens may be secured to the shake table at one end thereof and depend vertically therefrom, with the loading rings or hoops spinning in a horizontal plane. The term "cantilever" as used in the claims is intended to cover this type of arrangement as well as the arrangement of FIG. 1.

Another form of a fatigue taster embodying the invention is shown in FIG. 7 and provides testing of bearings such as radial bearings or the like. The radial bearing 36 is positioned on a journal 37 that is fixed to the top member 10 of a shake table, as previously described and illustrated by FIG. 1. The radial bearing 36 is retained by a bearing holder 38 that has a radially extending revolving mass 39 at a predetermined distance from the journal 37. The test arrangement as illustrated by FIG. 7 obtains wear life data on bearings under combined speed and load conditions. The rotating mass 39 provides a contrifugal force similar to the centrifugal force vector and stress vector previously discussed and illustrated by FIGS. 4 and 5.

Fatigue producing loads are provided by an additional modification of the fatigue testing arrangement of the invention as illustrated by FIG. 8. A preformed cup 40 is either secured to the top member 10 of a conventional shake table by a suitable means such as welding, or the cup 40 may be formed integral with the top member 10. A bearing, such as radial bearing 41, is retained within the cup 40. A rotating mass 42 is fixed to a journal 43 at a predetermined radial distance and excited to rotate by the response of the mass 42 to the cyclic action of the top member 10 of the shake table.

The fatigue testing arrangement of the invention as previously described provides a low cost device useable with low cost test specimens. It further provides an arrangement whereby numerous specimens may be tested simultaneously without conflict or interaction between adjacent specimens during the test.

As will be evidenced from the foregoing description, certain aspects of the invention are not limited to the particular details of the constructions as illustrated. For example, the fatigue testing of gear assemblies or individual gears under load conditions is possible by the improved fatigue testing arrangement of the invention. It is contemplated that other embodiments, modifications and applications of the invention may occur to those skilled in the art, and it is therefore intended that the appended claims shall cover all such embodiments, modifications and applications that do not depart from the spirit and scope of the invention.

What is claimed as new and is desired to secure by Letters Patent of the United States is:

1. A fatigue testing arrangement comprising: a shake table adapted to have cyclic movement imparted thereto; said table adapted to support a test specimen in a cantilever beam-type position thereon in a direction extending across at least one direction of motion of the table to develop motions in the test specimen in synchronism with movement of the table; a mass for each of said test specimens, said mass being adapted to be coupled to the test specimen at a point spaced from the free end of the specimen whereby the specimen imparts rotation to said mass about an axis of said mass as well as about an axis of said test specimen to develop a cyclic force about the cantilever axis of the specimen to develop fatigue testing stresses on the specimen.

2. The fatigue testing arrangement of claim 1 in which said mass is a ring.

3. The fatigue testing arrangement of claim 1 wherein said mass is coupled to the specimen at a reduced portion thereof.

4. A fatigue testing arrangement comprising: a shake table adapted to have cyclic movement imparted thereto; said table adapted to support a test specimen in a cantilever beam-type position in a direction extending across at least one direction of motion of the table to develop motions in the test specimen in synchronism with movement of the table; an appendage adapted to be secured to the free end of the specimen and extend along the cantilever axis of the specimen; a mass for each of said test specimens, said mass adapted to be coupled to said appendage at a point spaced from the free end of said appendage whereby the specimen and said appendage impart rotation to said mass about an axis of said mass as well as about an axis of said test specimen to develop a cyclic force about the cantilever axis of the specimen and said appendage to develop fatigue testing stresses on the specimen.

5. The fatigue testing arrangement of claim 4 in which said mass is a ring.

6. The fatigue testing arrangement of claim 4 wherein said mass is coupled to said appendage at a reduced portion thereof.

7. A fatigue testing arrangement comprising: a shake table adapted to have substantially linear cyclic movement along an axis of the table imparted thereto, said table adapted to have at least one test specimen secured thereto in a cantilever beam-type position in a direction extending generally perpendicular to said axis to develop motions in the specimen in synchronism with the movement of the table; a mass for said test specimen, said mass adapted to be coupled to the test specimen at a reduced portion in the specimen at a point spaced from the free end of said specimen whereby the specimen imparts rotation to said mass about an axis of said mass as well as about an axis of said test specimen to develop a cyclic force generally perpendicular to the cantilever axis of the specimen to develop alternating tensile and compressive stresses on the specimen.

8. The fatigue testing arrangement of claim 7 in which said mass is a ring.

9. A fatigue testing arrangement comprising: a shake table adapted to have substantially linear cyclic movement along an axis of the table imparted thereto; means to secure a test specimen in a cantilever beam-type position in a direction extending generally perpendicular to said axis to develop motion in the specimen in synchronism with movement of the table; an appendage adapted to be secured to the free end of the specimen and extend along the cantilever axis of said specimen; said appendage having a reduced portion at a point spaced from the free end of said appendage and generally parallel to said axis; a mass adapted to be coupled to said appendage at said reduced portion thereof, the specimen and said appendage upon cyclic movement of said table imparting rotation to said mass about an axis of said mass as well as about said reduced portion to develop a cyclic force generally perpendicular to the cantilever axis of the specimen and said appendage and develop alternating tensile and compressive stresses on the specimen.

10. The fatigue testing arrangement of claim 9 in which said mass is a ring.

11. A fatigue testing arrangement comprising: a shake table adapted to have cyclic movement imparted thereto; a test specimen having an axis of rotation; a first means to retain said specimen on said table to develop motions in said specimen in synchronism with movement of the table; a mass; and a second means to couple said mass to said specimen so that said mass is free to revolve and has its center of mass displaced from the axis of rotation of said test specimen, said specimen so arranged to cause said mass to revolve about an axis of said mass as well as about an axis of said test specimen to develop a cyclic force about the axis of rotation of said specimen to develop complex fatigue testing stresses on said specimen.

12. Testing apparatus comprising: a platform adapted to support one or more test specimens; means for oscillating said platform in a predetermined path to impart motion to said test specimens; and a mass coupled to each of said test specimens so that said mass is free to revolve and has its center of mass displaced from an axis of the test specimen whereby the motion of said test specimen excites said mass to revolve about an axis of the specimen as wall as about an axis of said mass.

13. Testing apparatus comprising: means adapted to support at least one test specimen; means for oscillating the test specimen support means in a fixed-amplitude linear path to impart motion to said test specimen in synchronism with said test specimen support means; and a mass coupled to each of said test specimens so that said mass is free to revolve and has its center of mass displaced from an axis of the test specimen whereby the motion of said test specimen excites said mass to revolve about an axis of the specimen as well as about an axis of said mass to develop testing stresses in said test specimens.

14. Testing apparatus comprising: means for oscillating one or more test specimens in a predetermined path; and means for imposing a cyclic load on each of said test specimens, said cyclic load being developed by a rotating vector force in response to a revolving mass whose center of mass is displaced from an axis of said test specimen so that the oscillations of said test specimen causes said mass to revolve about an axis of said test specimen as well as about an axis of the mass.

15. Testing apparatus comprising: a platform adapted to support one or more test specimens; means for oscillating said platform in a fixed-amplitude linear path to develop motion in said test specimens in synchronism with said platform; and means for imposing a cyclic force on said test specimens, said means including a mass revolving about an axis of each of said test specimens as well as about an axis of the mass itself, said mass being coupled to said test specimens so that its center of mass is displaced from an axis of said test specimen and caused to revolve by the motion of said test specimens.

16. A fatigue testing apparatus comprising:
 (a) a shake table adapted to have test specimens mounted thereon;
 (b) means for imparting cyclic movement to said shake table so that the test specimens mounted thereon are subjected to motions in synchronism with movement of the table;
 (c) and a mass for each of said test specimens, each mass being coupled to said test specimen so that it is free to revolve and has its center of mass displaced from an axis of the test specimen whereby the test specimen imparts cyclic rotation to said mass to cause said mass to revolve about its own axis as well as about an axis of the test specimen.

17. The fatigue testing apparatus of claim 16 wherein the frequency of the cyclic movement of said shake table may be varied.

References Cited by the Examiner

UNITED STATES PATENTS 2,356,894    8/44    Sims _____ 73—71.5

RICHARD C. QUEISSER, *Primary Examiner.*

JOSEPH P. STRIZAK, *Examiner.*